No. 851,353. PATENTED APR. 23, 1907.
C. E. HITE.
PRIMARY BATTERY.
APPLICATION FILED MAY 17, 1906.
2 SHEETS—SHEET 1.
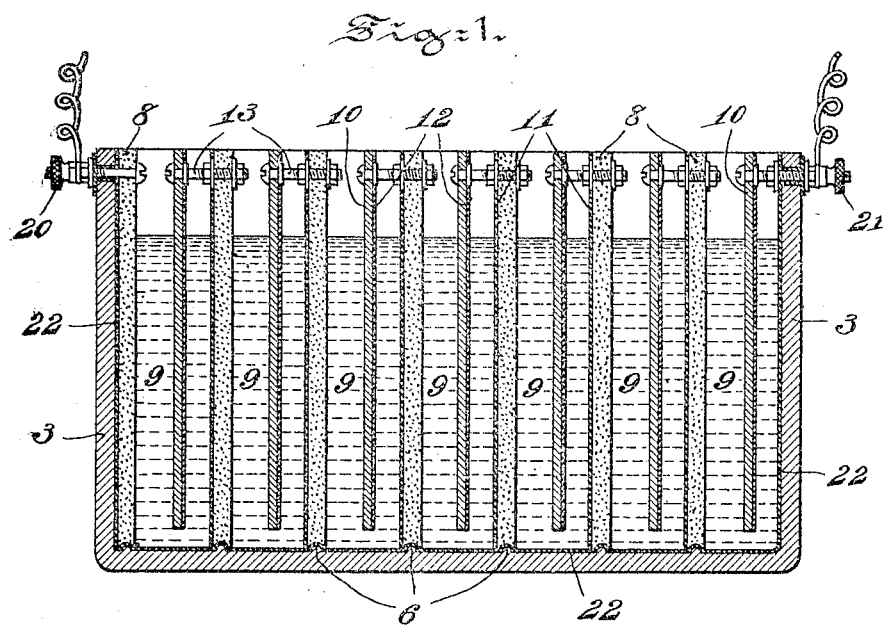
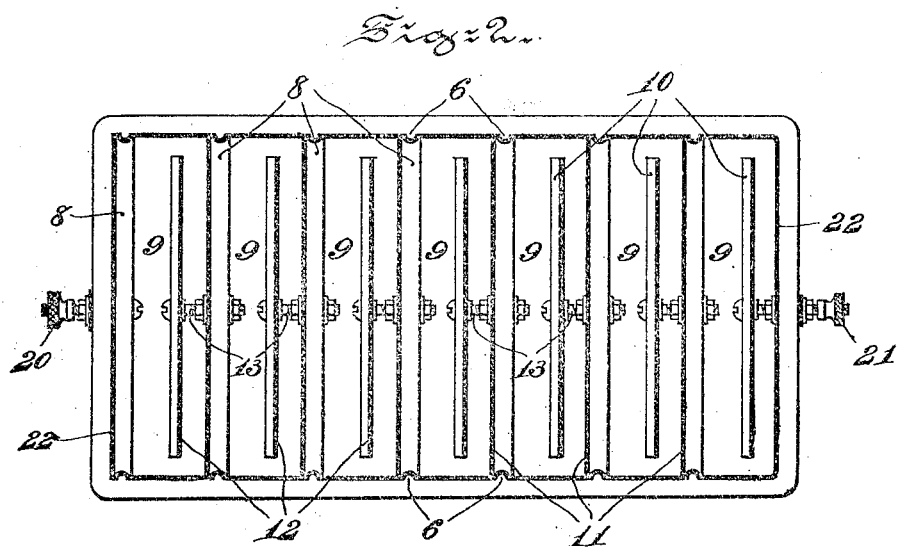
Witnesses:
Mae Hofmann
Howard Oke
Inventor:
Charles E. Hite,
By his Attorneys,

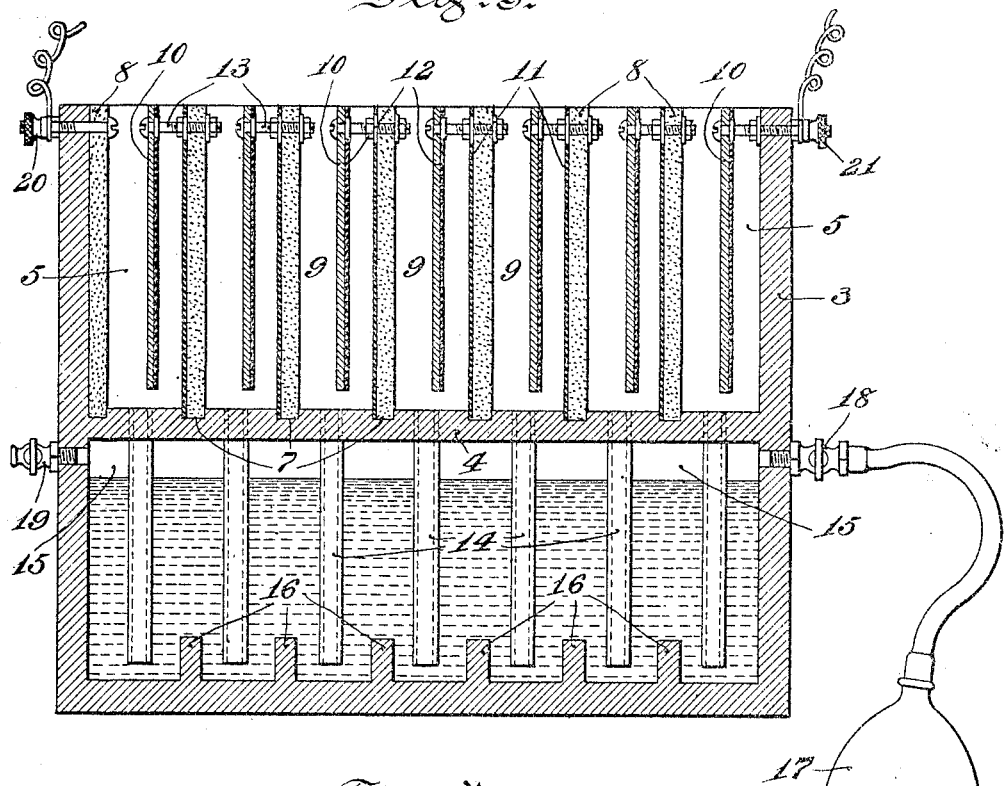
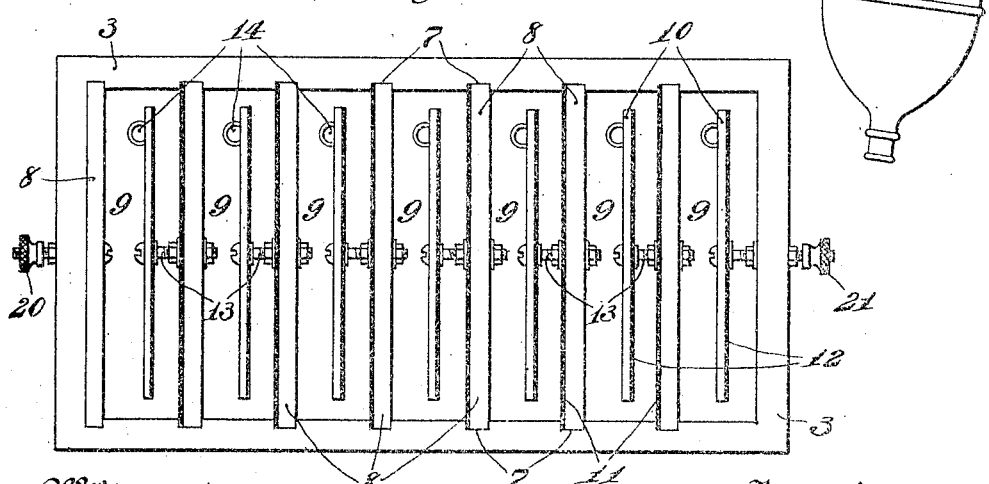

UNITED STATES PATENT OFFICE.

CHARLES E. HITE, OF BURLINGTON, NEW JERSEY, ASSIGNOR OF ONE-FOURTH TO THOMAS J. BYRNE, OF PHILADELPHIA, PENNSYLVANIA.

PRIMARY BATTERY.

No. 851,353.      Specification of Letters Patent.      Patented April 23, 1907.

Application filed May 17, 1906. Serial No. 317,300.

*To all whom it may concern:*

Be it known that I, CHARLES E. HITE, a citizen of the United States, residing at Burlington, in the county of Burlington, and State of New Jersey, have invented a new and useful Primary Battery, of which the following is a specification.

My invention relates to improvements in primary batteries.

My object is to provide an improved battery and means for increasing its life and efficiency.

My invention comprises improved means for providing separate cells or compartments for the active surfaces of electrode couples.

My invention comprises improved means for protecting the surfaces of the electrodes which should be inactive.

My invention comprises improved means for introducing the electrolyte into a plurality of cells from a common reservoir, and for discharging the electrolyte from said plurality of cells back to a common reservoir.

My invention comprises improved means for causing the separation of the residue of electrolyte contained in a common reservoir into a plurality of bodies corresponding to the several cells so as to interrupt electrical connection through the electrolyte between one cell and another.

Referring to the drawings:—Figure 1 is a longitudinal vertical section of a battery comprising my invention, suitable for open circuit work. Fig. 2 is a plan view of same. Fig. 3 is a longitudinal vertical section of a battery comprising my invention, suitable for closed circuit work. Fig. 4 is a plan view of same.

Similar numerals refer to similar parts throughout the several views.

My improved battery comprises a single receptacle in the form of a box 3, made either of insulating material or having an interior surface of suitable insulating material. Hard-rubber or cast iron enamelled, are examples of suitable materials.

The battery illustrated in Figs. 1 and 2 is an open circuit battery in which for example, ammonium chloride is used in connection with zinc and carbon electrodes. The box or receptacle 3 has its inner walls and bottom provided with the ribs 6. The carbon electrodes 8 have their walls channelled to receive said ribs 6. Said electrodes 8 are sealed with the ribs 6 or the adjacent walls of the receptacle 3 by suitable insoluble non-conducting material such as pitch, resin or alkaline proof varnish, and each carbon electrode 8 is coated upon one side with a similar material. This coating 11 of insoluble non-conducting material upon one side of each electrode 8 forms an efficient non-conducting partition between adjacent cells or compartments 9. This coating 11 is ordinarily a thin film of material not self-supporting. The carbon upon which it is placed serves as a support therefor; while with respect to its exposed face each carbon 8 is the electro-negative electrode of the couple in which the zinc electrode 10 is the electro-positive. These zinc electrodes 10 may be secured to the fixed carbon electrodes by the bolts 13 as shown in the drawings, or in any other suitable way. These zinc electrodes 10 may either be in the form of rods or flat plates as shown in the drawings. Where they are in the form of flat plates I likewise provide their inactive sides wth a coating 12 of similar insoluble non-conducting material so that said soluble electrode has one active surface only, which is directed toward the active surface of the next succeeding carbon electrode.

In Figs. 3 and 4 is illustrated a closed circuit battery in which, for example, an electrolyte of chromic acid is used in connection with zinc and carbon electrodes. Referring to said Figs. 3 and 4 the box 3 is provided with a horizontal partition 4 dividing the box into two separate compartments 5 and 15. The partition 4 is integral with, or sealed around its four sides to, the four sides of the box. The upper compartment 5 has its side walls, and partition 4, forming the bottom of compartment 5, provided with the channels 7. In the channels 7 are properly seated the electrodes 8, such for example as carbon plates. These electrodes are sealed in the channels and constitute liquid tight partitions forming the several cells 9. This is simply a modification of the projection and channel means for securing the electrodes in position as described in connection with Figs. 1 and 2. From each cell 9 extends a channel 14 to near the bottom of the compartment 15. This channel may be formed either by a tube sealed with and extending through the partition 4, or may be formed in the walls of box 3 around said partition 4. At the bottom of compartment 15 are provided a series of comparatively low partitions 16, corresponding in number and position to the partitions 8 of compartment 5

The electrolyte is normally stored in compartment 15. By forcing air into compartment 15 by hand-pump 17, or other suitable means, the electrolyte is forced up through channels 14 into the cells 9. As soon however, as the electrolyte reaches a level in compartment 15 below the tops of partitions 16, it is separated into several bodies corresponding in number to the cells 9, thus preventing any electrical connection through the common electrolyte between said cells 9. The hand-cock 18 is adapted to control the introduction of air to, and escape of air from compartment 15, that is, its chief purpose is to prevent the leak of air through the pump 17, while it is desired to maintain the battery in the active position. The cock 19 is adapted to permit the immediate escape of air from compartment 15 when it is desired to discharge the electrolyte from the cells. The binding posts 20 and 21 are secured in the usual way to the terminal electrodes of opposite polarity. The lining for the box 3 composed of enamel or other insoluble non-conducting material is indicated at 22.

What I claim is:—

1. In a primary battery, the combination of a receptacle, a plurality of partition-supporting electrodes dividing the receptacle into a plurality of compartments or cells, one of said electrodes only being placed between each pair of cells divided thereby.

2. In a primary battery, the combination of a receptacle, a plurality of partition-supporting electrodes dividing the receptacle into a plurality of compartments or cells, said partitions consisting of a coating of insoluble non-conducting material upon one side of each electrode, one of said electrodes only being placed between each pair of cells divided thereby.

3. In a primary battery, the combination of a receptacle, a plurality of electrode plates secured in said receptacle and dividing the receptacle into compartments, a coating of insoluble non-conducting material upon one side of each of said electrodes extending to the sides and bottom of the receptacle adjacent the edges of the electrodes forming said compartments into liquid tight cells.

4. In a primary battery, the combination of a receptacle, a single film of insoluble non-conducting material forming a partition dividing the receptacle into cells and an electrode supporting said partition.

5. In a primary battery, the combination of a receptacle, a plurality of partition-supporting electrodes dividing the receptacle into a plurality of compartments or cells, and electrodes of opposite polarity projecting into said cells and connected with said partition-supporting electrodes, one of said partition-supporting electrodes only being placed between each pair of cells divided thereby.

6. In a primary battery, the combination of a receptacle, a plurality of partition supporting electrodes dividing the receptacle into a plurality of compartments or cells, and electrodes of opposite polarity connected with and supported by said partition supporting electrodes.

7. In a primary battery, the combination of a receptacle, a plurality of electrodes seated therein by means of grooves, a coating of insoluble non-conducting material covering one side of each of said electrodes and extending to the sides and bottom of the receptacle adjacent the edges of the electrodes to form liquid tight partitions between a plurality of cells.

8. In a primary battery, the combination of a receptacle, a plurality of partition supporting electrodes dividing the receptacle into a plurality of compartments or cells, and electrodes of opposite polarity projecting into said cells and connected with said partition-supporting electrodes, said electrodes coated on all sides except their active sides with insoluble non-conducting material.

9. A primary battery, comprising a plurality of cells, a reservoir containing common electrolyte, means for transferring the major portion of the electrolyte from the reservoir to the cells and means for causing the separation of the residue of electrolyte contained in the reservoir into a number of separate bodies corresponding to the number of cells to prevent electrical communication, through the electrolyte, between said cells.

10. A primary battery, comprising a plurality of cells, a reservoir containing common electrolyte, air pressure controlled means for transferring the major portion of the electrolyte from the reservoir to the cells and means for causing the separation of the residue of electrolyte contained in the reservoir into a number of separate bodies corresponding to the number of cells to prevent electrical communication, through the electrolyte, between said cells.

11. In a primary battery, the combination of a plurality of cells, a common reservoir for containing electrolyte having communication with said cells, means for causing the electrolyte to rise in the cells from the common reservoir, a plurality of partitions in said reservoir for separating the residue of electrolyte contained therein, into a number of separate bodies when the greater part of electrolyte has risen in the cells.

12. In a primary battery, the combination of a plurality of cells, a reservoir for electrolyte common to all the cells, channels leading from the cells to near the bottom of the reservoir, said channels adapted to be trapped by the residue of the electrolyte in the reservoir when the cells are in action, and means for separating said residue of electrolyte into a number of bodies corresponding to the number of channels trapped thereby 13. In a primary battery, the combination of a plurality of cells, a reservoir for electrolyte common to all the cells, channels leading from the cells to near the bottom of the reservoir, said channels adapted to be trapped by the residue of the electrolyte in the reservoir when the cells are in action, means for compressing the air in the reservoir chamber to cause the electrolyte to rise through the channels into the cells, and means for separating said residue of electrolyte into a number of bodies corresponding to the number of channels trapped thereby.

14. In a primary battery, the combination of a receptacle, a plurality of partition supporting electrodes dividing the receptacle into a plurality of compartments or cells, a reservoir containing a common electrolyte, means for conveying the major portion of the electrolyte from the reservoir to the cells and means for causing the separation of the residue of the electrolyte contained in the reservoir into a number of separate bodies corresponding to the number of cells to prevent electrical communication through the electrolyte between said cells.

15. In a primary battery, the combination of a receptacle, a galvanic couple, one element of which supports a coating of insoluble non-conducting material which forms a partition between two cells in said receptacle, an electro-positive electrode and an electro-negative electrode forming the terminals of the battery, the said galvanic couple being interposed between said terminal electrodes.

CHARLES E. HITE.

Witnesses:
 EUGENE ZIEGLER,
 MAE HOFMANN.